United States Patent
Zhang et al.

(10) Patent No.: US 8,385,283 B2
(45) Date of Patent: Feb. 26, 2013

(54) REAL-TIME SERVICE TRANSMISSION METHOD AND RESOURCE ALLOCATION METHOD

(75) Inventors: Yincheng Zhang, Shenzhen (CN); Hua Rui, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 302 days.

(21) Appl. No.: 12/744,250

(22) PCT Filed: Jan. 13, 2009

(86) PCT No.: PCT/CN2009/070122
§ 371 (c)(1),
(2), (4) Date: May 21, 2010

(87) PCT Pub. No.: WO2009/089798
PCT Pub. Date: Jul. 23, 2009

(65) Prior Publication Data
US 2010/0246521 A1 Sep. 30, 2010

(30) Foreign Application Priority Data
Jan. 14, 2008 (CN) .......................... 2008 1 0002140

(51) Int. Cl.
*H04W 4/00* (2009.01)

(52) U.S. Cl. ..................................................... 370/329

(58) Field of Classification Search .................. 370/203, 370/204–215, 229–240, 310–337, 338–350, 370/395.1, 395.3, 395.4, 395.41, 395.42, 370/395.5, 395.52, 395.53, 412–421, 431–529, 370/523–520
See application file for complete search history.

(56) References Cited

U.S. PATENT DOCUMENTS
(Continued)

FOREIGN PATENT DOCUMENTS
CN 101137098 A 3/2008
JP 2008278343 A 11/2008
(Continued)

OTHER PUBLICATIONS

Supplementary European Search Report in European application No. 09702409.5, mailed on Mar. 28, 2011.
(Continued)

*Primary Examiner* — Kwang B Yao
*Assistant Examiner* — Jung-Jen Liu
(74) *Attorney, Agent, or Firm* — Oppedahl Patent Law Firm LLC

(57) ABSTRACT

The invention discloses a method for real-time service transmission and a method for resource allocation, wherein, the method for resource allocation of real-time service transmission includes the following processing: through the resource allocation control channels, the base station allocates the semi-static service channel resources to the terminal to be used for the initial transmission of hybrid automatic repeat request of the real-time service packets; wherein, before the base station reconfigures or releases the semi-static service channel resources, the terminal can use the semi-static service channel resources continuously; through the resource allocation control channels, the base station allocates the dynamic service channel resources to the terminal to be used for the retransmission of the hybrid automatic repeat request of the real-time service packets; wherein, the terminal can only use the dynamic service channel resources within the allocated time frame. The present invention can ensure the real time of service transmission and reduce the control signaling overhead during service transmission, thereby ensuring the QoS requirements of service.

35 Claims, 6 Drawing Sheets

U.S. PATENT DOCUMENTS

| | | | | |
|---|---|---|---|---|
| 2006/0203760 A1* | 9/2006 | Fukui et al. | ............... | 370/328 |
| 2006/0203780 A1* | 9/2006 | Terry | ............... | 370/335 |
| 2008/0008212 A1* | 1/2008 | Wang et al. | ............... | 370/503 |
| 2009/0327828 A1* | 12/2009 | Ojala et al. | ............... | 714/749 |
| 2010/0169724 A1* | 7/2010 | Terry | ............... | 714/704 |
| 2010/0284364 A1* | 11/2010 | You et al. | ............... | 370/330 |

FOREIGN PATENT DOCUMENTS

| | | |
|---|---|---|
| JP | 2010532962 A | 10/2010 |
| JP | 2011509012 A | 3/2011 |
| KR | 20040041490 A | 5/2004 |
| KR | 20070055616 A | 5/2007 |
| KR | 20070081940 A | 8/2007 |
| KR | 20070102164 A | 10/2007 |
| WO | 2006086359 A2 | 8/2006 |
| WO | 2007087842 A1 | 8/2007 |
| WO | 2007129645 A1 | 11/2007 |
| WO | 2009025525 A1 | 2/2009 |
| WO | 2009086668 A1 | 7/2009 |

OTHER PUBLICATIONS

Uplink Scheduling for VoIP.
Uplink VoIP Performance.
Report of E-Mail Discussion: DL Scheduling.
3GPP TR 30.302 V7.1.0 (Jun. 2007), Technical Report, 3rd Generation Partnership Project; Technical Specification Group Radio Access Network; 1.28 Mcps TDD Enhanced Uplink; RAN WG2 Stage 2 Decisions (Release 7), Jun. 30, 2007, pp. 1-28, 3GPP, Valbonne, France.
Yonghong Chang and Yan Yao, Study and Algorithms Optimization of HSUPA High Speed Scheduling Technology, Telecommunications Science, Nov. 30, 2007, 1 page, English Translation: pp. 1-2.
PCT International Search Report, International Application No. PCT/CN2009/070122, Date of Mailing: Apr. 23, 2009, Date of Completion: Mar. 29, 2009, pp. 1-2, English Translation: pp. 1-2.
PCT Written Opinion of the International Searching Authority, International Application No. PCT/CN2009/070122, Date of Mailing: Apr. 23, 2009, Date of Completion: Apr. 11, 2009, pp. 1-5.

* cited by examiner

Fig. 1
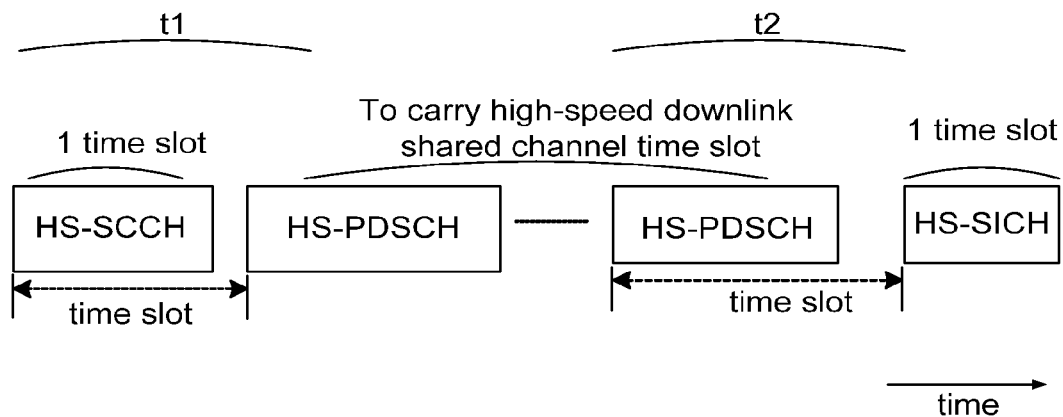
Fig. 2
| channelized code set information (8 bits) | Time slot position information (5 bits) | MF (1 bit) | TBS (6 bits) | HARD (3 bits) | RV (3 bits) | NDI (1 bit) | Cyclic Sequence Number (3 bits) | UE ID (CRC) (16 bits) |
|---|---|---|---|---|---|---|---|---|
Fig. 3
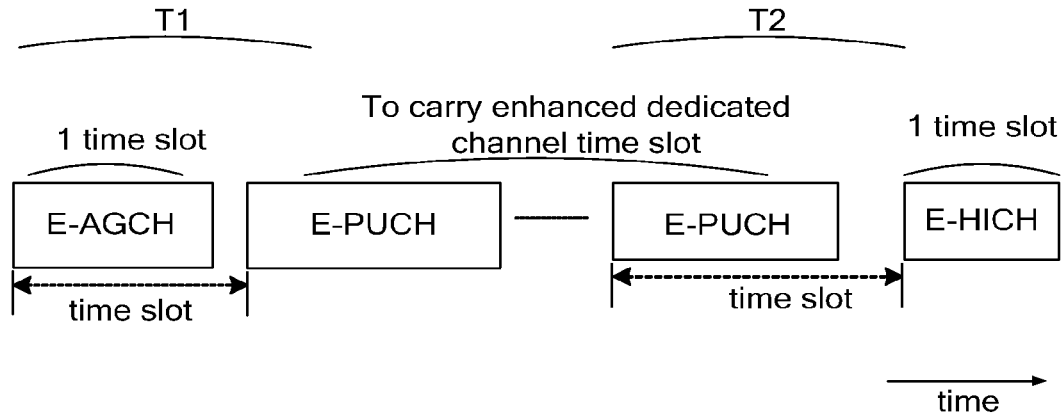

| AGV (5 bits) | CRRI (5 bits) | TRRI (5 bits) | ECSN (3 bits) | RDI (3 bits) | EI (2 bits) | ENI (3 bits) | UE ID (CRC) (16 bits) |
|---|---|---|---|---|---|---|---|

REAL-TIME SERVICE TRANSMISSION METHOD AND RESOURCE ALLOCATION METHOD

TECHNICAL FIELD

The present invention relates to real-time service transmission and its resource allocation in synchronous wireless communication systems, and specifically relates to a resource allocation method for real-time service transmission and a method for uplink/downlink real-time service transmission.

BACKGROUND

In order to provide higher-speed uplink and downlink packet services and improve the utilization efficiency of frequency spectra, 3GPP (3rd Generation Partnership Project) has introduced high speed downlink packet access (shortened as HSDPA) and high speed uplink packet access (shortened as HSUPA) features in specifications for TD-SCDMA systems, and has reduced the network processing time delay by introducing adaptive modulation and coding (shortened as AMC), hybrid automatic repeat request (shortened as HARQ) and a Node B control scheduling technique, thereby having improved the speed of uplink/downlink packet services and the utilization efficiency of frequency spectra.

In HSDPA and HSUPA technologies, an MAC-hs sub-layer and an MAC-e sub-layer as well as relevant entities have been introduced into a media access control (shortened as MAC) layer, respectively. On the network side, the MAC-hs sub-layer, MAC-e sub-layer and relevant entities are all located in the Node B. The MAC-hs sub-layer, MAC-e sub-layer and entities not only accomplish uplink/downlink data processing functions, but also are responsible for management and scheduling of related wireless physical channel resources in the HSDPA and HSUPA technologies.

In the HSDPA technology of TD-SCDMA (Time Division-Synchronous Code Division Multiple Access) systems, wireless physical channel resources newly introduced include: high speed physical downlink shared channels (shortened as HS-PDSCH), shared control channels for HS-DSCH (shortened as HS-SCCH) and shared information channels for HS-DSCH (shortened as HS-SICH). Wherein, the HS-PDSCH is used to carry user' service data, the HS-SCCH is used to carry related control information of controlling a UE (User Equipment) to receive the HS-PDSCH, and the HS-SICH is used to carry feedback information that the UE sends to the Node B, indicating that the HS-PDSCH and user service data have been received by the UE. In the HSDPA technology, the transmit time interval (shortened as TTI) of the HS-SCCH, the HS-PDSCH and the HS-SICH is all 5 ms, FIG. 1 is a schematic diagram illustrating the timing relationship among the HS-SCCH, HS-PDSCH and HS-SICH in the HSDPA technology in the TD-SCDMA system based on related technologies; as shown in FIG. 1, wherein, the signaling channels HS-SCCH and HS-SICH which are used for scheduling and controlling are configured with one-to-one correspondence and are used in pairs.

FIG. 2 is a schematic diagram illustrating the structure of data field information carried by the HS-SCCH, which, as shown in FIG. 2, specifically contains the following control information: an HARQ Process ID, which takes 3 bits; redundance version (RV) information, which takes 3 bits; a new data indicator (shortened as NDI), which takes 1 bit; an HS-SCCH cyclic sequence number (HCSN), which takes 3 bits; a UE ID (CRC—cyclic redundancy check), which takes 16 bits; a modulation format indicator (MF), which takes 1 bit; transport block size information (shortened as TBS), which takes 6 bits; the channelized code set information, which takes 8 bits; and time slot position information, which takes 5 bits.

In the HSUPA technology of the TD-SCDMA system, regarding the physical layer, the HSUPA technology has newly introduced E-DCH physical uplink channels (shortened as E-PUCH) to carry user service data, wherein, the E-DCH is an enhanced dedicated channel. In the HSUPA technology, the E-PUCH can be differentiated into scheduling and non-scheduling E-PUCHs. A radio network controller (shortened as RNC) allocates the non-scheduling E-PUCH channel resources, and as long as such resources are available, the UE can transmit the channels at any time. For the scheduling E-PUCH channel resources, they are allocated dynamically by the MAC-e sub-layer and entity in the Node B according to the UE's request. At the same time, downlink E-DCH absolute grant channels (shortened as E-AGCH) and uplink E-DCH hybrid ARQ indicator channels (shortened as E-HICH) have also been newly introduced. The E-AGCH is used to carry related control information that the Node B grants the scheduling E-PUCH to the UE to send, while the E-HICH is used to carry receipt acknowledgement indication information of the user service data on the E-PUCH channel that the Node B sends to the UE. FIG. 3 is a schematic diagram illustrating the timing relationship among the E-AGCH, E-PUCH and E-HICH channels in the HSDPA technology in the TD-SCDMA system based on related technologies, as shown in FIG. 3, the transmit time interval (TTI) of the E-AGCH, the E-PUCH and the E-HICH is all 5 ms.

FIG. 4 is a schematic diagram illustrating the structure of data field information carried by the E-AGCH, which, as shown in FIG. 4, contains the following control information: an absolute grant (power) value (AGV), code resource information (CRRI), time slot resource information (TRRI), an E-AGCH cyclic sequence number (ECSN), a resource durability indicator (RDI), an E-HICH indicator (EI), an E-UCCH (Enhanced Uplink Control Channel) number indicator (ENI) and a UE ID (CRC cyclic redundancy check).

In the HSDPA technology, if the service being transmitted is a real-time service (such as a VoIP service, i.e. IP telephony), then one method is allowing the Node B, through the HS-SCCH, to allocate the HS-PDSCH resources either long-lasting continuously or periodically dynamically to transmit service data to the UE; the disadvantage of this method is that the overheads of the control channels HS-SCCH and HS-SICH are large, and such a disadvantage becomes even more significant especially for those services with a relatively low traffic. Another improved method is using an HS-SCCH-less technology, i.e. simplifying control parameters during the HSDPA transmission process, such as fixing or preconfiguring some parameters, preallocating some HS-PDSCH physical channel resources and combining a blind detection technique, so that it is not necessary to send the HS-SCCH during the first HARQ transmission of data packets of this type of services, i.e. the HS-PDSCH channel resources granted by the HS-SCCH is not sent during transmission of new packets, but the preallocated HS-PDSCH channel resources and parameters are used for transmitting new packets. In such a method, firstly the RNC or the Node B preallocates the HS-PDSCH channel resources, and then sends them to the UE through an upper layer signaling. The disadvantage of this method is that the signaling time delay is quite significant during reconfiguration of the preallocated HS-PDSCH channel resources, without being able to offer dynamic reconfiguration.

In the HSUPA technology, if the service being transmitted is a real-time service (such as a VoIP service), then one method is allowing the Node B, through the E-AGCH, to allocate the scheduling E-PUCH resources either long-lasting continuously or periodically dynamically to transmit service data to the UE; the disadvantage of this method is that the overhead of the control channel E-AGCH is large, and such a disadvantage becomes even more significant especially for those services with a relatively low traffic, moreover, it is also difficult to ensure real-time services. Another method is performing the first HARQ transmission of packets through a non-scheduling approach, while performing the HARQ retransmission of packets through a scheduling approach. In such a method, it is the RNC that allocates the non-scheduling E-PUCH resources according to existing technologies, and then sends them to the Node B and the UE, respectively, through an upper layer signaling. The disadvantage of this method is also that the signaling time delay is quite significant during reconfiguration of the non-scheduling E-PUCH resources, without being able to offer dynamic reconfiguration.

It can be seen from the above descriptions that whether for the HSDPA technology or the HSUPA technology, during the performance of resource allocation of the real-time service transmission, there is a problem of the high control channel overhead, the long signaling time delay during reconfiguration of the preallocated channel resources, and the inability to offer dynamic reconfiguration.

SUMMARY

The present invention has been initiated to tackle at least one of the two problems regarding the allocation of real-time service transmission resources based on related technologies, one being that the control channel overhead is large and the other being that the signaling time delay during reconfiguration of the preallocated channel resources is long. Therefore, the present invention is intended to provide a resource allocation method for real-time service transmission and a method for uplink/downlink real-time service transmission, which is capable of overcoming at least one of the above mentioned problems by allocating different service channel resources to be used for initial transmission and retransmission of HARQ.

In order to achieve the above mentioned objective, based on one aspect of the present invention, a resource allocation method for real-time service transmission is provided that is used for a base station to allocate service channel resources to a terminal for real-time service transmission; wherein, there are resource allocation control channels existing between the terminal and the base station.

The method for resource allocation of real-time service transmission according to the present invention includes the following processing: through the resource allocation control channels, the base station allocates semi-static service channel resources to the terminal to be used for initial transmission of hybrid automatic repeat request of real-time service packets; wherein, before the base station reconfigures or releases the semi-static service channel resources, the terminal can use the semi-static service channel resources continuously; through the resource allocation control channels, the base station allocates dynamic service channel resources to the terminal to be used for retransmission of the hybrid automatic repeat request of the real-time service packets; wherein, the terminal can only use the dynamic service channel resources within the allocated time.

In order to achieve the above mentioned objective, based on another aspect of the present invention, an uplink real-time service transmission method is provided that is used to perform uplink real-time service transmission between a terminal and a base station; wherein, there are resource allocation control channels and information feedback control channels existing between the terminal and the base station.

The uplink real-time service transmission method according to the present invention includes the following processing: the base station allocates semi-static service channel resources to the terminal; wherein, before the base station reconfigures or releases the semi-static service channel resources, the terminal can use the semi-static service channel resources continuously; the terminal uses the semi-static service channel resources to perform initial transmission of hybrid automatic repeat request of real-time service packets; the base station receives the semi-static service channel resources, determines if the initially transmitted real-time service packet is correct, and allocates the dynamic service channel resources to the terminal once it determines that the initially transmitted real-time service packet is incorrect; the terminal uses the dynamic service channel resources to retransmit the real-time service packets; the base station receives the dynamic service channel resources, determines if the retransmitted real-time service packet is correct, and reallocates the dynamic service channel resources to the terminal once it determines that the retransmitted real-time service packet is incorrect and the number of retransmissions doesn't reach a predefined threshold value.

Wherein, in the above mentioned processing, the base station allocates the semi-static service channel resources and the dynamic service channel resources through the resource allocation control channels.

Wherein, in the above mentioned processing, the base station will, once having determined that the initially transmitted or retransmitted real-time service packet is correct, send a hybrid automatic repeat request correct-receipt indication message to the terminal through the information feedback control channel.

Wherein, under the condition that the base station determines that the initially transmitted or retransmitted real-time service packet is incorrect, the above mentioned method further comprises: the base station sends the hybrid automatic repeat request incorrect-receipt indication message to the terminal through the information feedback control channel, and the base station saves the incorrect real-time service packet.

Wherein, the specific operation for determining if the retransmitted real-time service packet is correct is: the base station determines if the retransmitted real-time service packet received is correct; the base station determines if the packet generated by merging the retransmitted real-time service packet received and the incorrectly received real-time service packet previously saved is correct.

Wherein, the information feedback control channels are allocated through the following operation: semi-static information feedback control channels are allocated to the terminal through the resource allocation control channels that are used for the allocation of the semi-static service channel resources; wherein, there is one-to-one correspondence between the semi-static information feedback control channel and the resource allocation control channel.

Moreover, the information feedback control channels can also be allocated through the following operation: through an upper layer signaling, the semi-static information feedback control channels are allocated to the terminal.

In order to achieve the above mentioned objective, based on another aspect of the present invention, a downlink real-time service transmission method is provided that is used to perform downlink real-time service transmission between a terminal and a base station, wherein, there are resource allocation control channels and information feedback control channels existing between the terminal and the base station.

The downlink real-time service transmission method according to the present invention includes the following processing: the base station allocates semi-static service channel resources to the terminal; wherein, before the base station reconfigures or releases the semi-static service channel resources, the terminal can use the semi-static service channel resources continuously; the base station uses the semi-static service channel resources to perform initial transmission of hybrid automatic repeat request of real-time service packets; the terminal receives the semi-static service channel resources, determines if the initially transmitted real-time service packet is correct, and feeds back a hybrid automatic repeat request incorrect-receipt indication message to the base station once it determines that the initially transmitted real-time service packet is incorrect; the base station allocates dynamic service channel resources to the terminal; the base station uses the dynamic service channel resources to retransmit the real-time service packet; the terminal receives the dynamic service channel resources, determines if the retransmitted real-time service packet is correct, and feeds back the hybrid automatic repeat request incorrect-receipt indication message to the base station once it determines the retransmitted real-time service packet is incorrect.

Wherein, the base station allocates the semi-static service channel resources and the dynamic service channel resources through the resource allocation control channels.

Wherein, the terminal will, once having determined that the initially transmitted or retransmitted real-time service packet is correct, send hybrid automatic repeat request correct-receipt indication message to the base station through the information feedback control channel.

Wherein, under the condition that the terminal determines that the initially transmitted or retransmitted real-time service packet is incorrect, the above mentioned method further comprises: the terminal sends the hybrid automatic repeat request incorrect-receipt indication message to the base station through the information feedback control channel, and the terminal saves the incorrect real-time service packet.

Wherein, the specific operation for determining if the retransmitted real-time service packet is correct is: the terminal determines if the retransmitted real-time service packet received is correct; or the terminal determines if the packet generated by merging the retransmitted real-time service packet received and the incorrectly received real-time service packet previously saved is correct.

Wherein, in the above mentioned method, under the condition that the terminal has determined that the retransmitted real-time service packet is incorrect and has fed back the hybrid automatic repeat request incorrect-receipt indication message to the base station, if the base station determines that the number of retransmissions doesn't reach a predefined threshold value, then the dynamic service channel resources will be reallocated to the terminal.

Wherein, the information feedback control channels are allocated through the following operation: the semi-static information feedback control channels are allocated to the terminal through the resource allocation control channels that are used for the allocation of the semi-static service channel resources; wherein, there is one-to-one correspondence between the semi-static information feedback control channel and the resource allocation control channel.

Moreover, the information feedback control channels can also be allocated through the following operation: through an upper layer signaling, the semi-static information feedback control channels are allocated to the terminal.

And, the approaches to the continuous use in the above mentioned various methods include: continuous use and/or periodical use in terms of time.

In order to achieve the above mentioned objective, based on one aspect of the present invention, a resource allocation method for real-time service transmission is provided, including:

allocating semi-static service channel resources to a terminal through resource allocation control channels, wherein said semi-static service channel resources are used continuously by said terminal for initial transmission of hybrid automatic repeat request of real-time service packets before being reconfigured or released; and allocating dynamic service channel resources to said terminal through said resource allocation control channels, wherein said dynamic service channel resources are used by said terminal for retransmission of hybrid automatic repeat request of real-time service packets only within allocated time.

Wherein, said continuously used method includes: continuous use and/or periodical use in terms of time.

In order to achieve the above mentioned objective, based on one aspect of the present invention, an uplink real-time service transmission method is provided, including:

allocating semi-static service channel resources to said terminal; wherein said semi-static service channel resources are used by said terminal continuously before being reconfigured or released;

receiving from said terminal said semi-static service channel resources for performing initial transmission of hybrid automatic repeat request of real-time service packets;

determining if said initially transmitted real-time service packet is correct, and allocating dynamic service channel resources to said terminal when said initially transmitted real-time service packet is determined to be incorrect;

receiving from said terminal said dynamic service channel resources for retransmitting said real-time service packet; and determining if said retransmitted real-time service packet is correct, and reallocating dynamic service channel resources to said terminal when said retransmitted real-time service packet is determined incorrect and the number of retransmissions doesn't reach a predefined threshold value.

Wherein said semi-static service channel resources and said dynamic service channel resources are allocated through resource allocation control channels.

Preferably, the uplink real-time service transmission method may further include: sending a hybrid automatic repeat request correct-receipt indication message to said terminal through an information feedback control channel under the condition that said initially transmitted or retransmitted real-time service packet is determined correct.

Preferably, the uplink real-time service transmission method may further include: under the condition that said initially transmitted or retransmitted real-time service packet is determined incorrect, sending a hybrid automatic repeat request incorrect-receipt indication message to said terminal through an information feedback control channel; and saving said incorrect real-time service packet.

Wherein, said operation for determining if said retransmitted real-time service packet is correct specifically includes:
determining if said retransmitted real-time service packet received is correct; or
determining if a packet obtained after merging said retransmitted real-time service packet received with said previously saved real-time service packet incorrectly received is correct.

Wherein, said information feedback control channel is allocated through the following operation:
a semi-static information feedback control channel is allocated to said terminal through the resource allocation control channel used to allocate said semi-static service channel resources; wherein, there is one-to-one correspondence between said semi-static information feedback control channel and said resource allocation control channel; or
a semi-static information feedback control channels is allocated to said terminal through an upper layer signaling.

Wherein, said continuously used method includes: continuous use and/or periodical use in terms of time.

In order to achieve the above mentioned objective, based on one aspect of the present invention, a downlink real-time service transmission method is provided, including:
allocating semi-static service channel resources to said terminal; wherein, said semi-static service channel resources are used by said terminal continuously before being reconfigured or released;
using said semi-static service channel resources to perform initial transmission of hybrid automatic repeat request of real-time service packets;
through an information feedback control channel, receiving from said terminal a hybrid automatic repeat request correct-receipt indication message which indicates that said initially transmitted real-time service packet is correct, or receiving from said terminal a hybrid automatic repeat request incorrect-receipt indication message which indicates that said initially transmitted real-time service packet is incorrect;
allocating dynamic service channel resources to said terminal in the case of receiving the hybrid automatic repeat request incorrect-receipt indication message from said terminal;
using said dynamic service channel resources to retransmit said real-time service packet; and
through the information feedback control channel, receiving from said terminal a hybrid automatic repeat request correct-receipt indication message which indicates that said retransmitted real-time service packet is correct, or receiving from said terminal a hybrid automatic repeat request incorrect-receipt indication message which indicates that said retransmitted real-time service packet is incorrect.

Preferably, the downlink real-time service transmission method may further include: reallocating dynamic service channel resources to said terminal under the condition that said hybrid automatic repeat request incorrect-receipt indication message is received from said terminal and the number of retransmissions does not reach a predefined threshold value.

Wherein, said information feedback control channel is allocated through the following operation:
a semi-static information feedback control channel is allocated to said terminal through the resource allocation control channel used to allocate said semi-static service channel resources; wherein, said semi-static information feedback control channel is one-to-one correspondent to said resource allocation control channel; or
a semi-static information feedback control channel is allocated to said terminal through an upper layer signaling.

Wherein, said semi-static service channel resources and said dynamic service channel resources are allocated through resource allocation control channels.

Wherein, said continuously used method includes: continuous use and/or periodical use in terms of time.

In one aspect of the present invention, an apparatus for resource allocation is provided, including:
at least one processors configured to:
allocate semi-static service channel resources which are used continuously for initial transmission of hybrid automatic repeat request of real-time service packets before being reconfigured or released; and
allocate dynamic service channel resources which are used for retransmission of hybrid automatic repeat request of real-time service packets only within allocated time.

In another aspect of the present invention, an apparatus for real-time service transmission is provided, including:
at least one processor configured to:
allocate semi-static service channel resources which are used continuously before being reconfigured or released;
receive said semi-static service channel resources for performing initial transmission of hybrid automatic repeat request of real-time service packets;
determine if said initially transmitted real-time service packet is correct, and allocate dynamic service channel resources when said initially transmitted real-time service packet is determined to be incorrect;
receive said dynamic service channel resources for retransmitting said real-time service packet; and
determine if said retransmitted real-time service packet is correct, and reallocate dynamic service channel resources when said retransmitted real-time service packet is determined incorrect and the number of retransmissions does not reach a predefined threshold value.

Preferably, the at least one processor may be further configured to:
send a hybrid automatic repeat request correct-receipt indication message under the condition that said initially transmitted or retransmitted real-time service packet is determined correct; and
send a hybrid automatic repeat request incorrect-receipt indication message and save said incorrect real-time service packet, under the condition that said initially transmitted or retransmitted real-time service packet is determined incorrect.

In yet another aspect of the present invention, an apparatus for real-time service transmission is provided, including:
at least one processor configured to:
allocate semi-static service channel resources which are used continuously before being reconfigured or released;
use said semi-static service channel resources to perform initial transmission of hybrid automatic repeat request of real-time service packets;
receive a hybrid automatic repeat request correct-receipt indication message which indicates that said initially transmitted real-time service packet is correct, or receive a hybrid automatic repeat request incorrect-receipt indication message which indicates that said initially transmitted real-time service packet is incorrect;
allocate dynamic service channel resources in the case of receiving the hybrid automatic repeat request incorrect-receipt indication message;
use said dynamic service channel resources to retransmit said real-time service packet; and receive a hybrid automatic repeat request correct-receipt indication message which indicates that said retransmitted real-time service packet is correct, or receive a hybrid automatic repeat request incorrect-receipt indication message which indicates that said retransmitted real-time service packet is incorrect.

In one aspect of the present invention, an apparatus for resource allocation is provided, including:

means for allocating semi-static service channel resources which are used continuously for initial transmission of hybrid automatic repeat request of real-time service packets before being reconfigured or released; and means for allocating dynamic service channel resources, wherein said dynamic service channel resources are used for retransmission of hybrid automatic repeat request of real-time service packets only within allocated time.

In one aspect of the present invention, an apparatus for real-time service transmission is provided, including:

means for allocating semi-static service channel resources; wherein said semi-static service channel resources are used continuously before being reconfigured or released;

means for receiving said semi-static service channel resources for performing initial transmission of hybrid automatic repeat request of real-time service packets;

means for determining if said initially transmitted real-time service packet is correct, and allocating dynamic service channel resources when said initially transmitted real-time service packet is determined to be incorrect;

means for receiving said dynamic service channel resources for retransmitting said real-time service packet; and means for determining if said retransmitted real-time service packet is correct, and reallocating dynamic service channel resources when said retransmitted real-time service packet is determined incorrect and the number of retransmissions doesn't reach a predefined threshold value.

Preferably, the apparatus may further include:

means for sending a hybrid automatic repeat request correct-receipt indication message under the condition that said initially transmitted or retransmitted real-time service packet is determined correct; and means for sending a hybrid automatic repeat request incorrect-receipt indication message and saving said incorrect real-time service packet, under the condition that said initially transmitted or retransmitted real-time service packet is determined incorrect.

In one aspect of the present invention, an apparatus for real-time service transmission is provided, including:

means for allocating semi-static service channel resources; wherein, said semi-static service channel resources are used continuously before being reconfigured or released;

means for using said semi-static service channel resources to perform initial transmission of hybrid automatic repeat request of real-time service packets;

means for receiving a hybrid automatic repeat request correct-receipt indication message which indicates that said initially transmitted real-time service packet is correct, or receiving a hybrid automatic repeat request incorrect-receipt indication message which indicates that said initially transmitted real-time service packet is incorrect;

means for allocating dynamic service channel resources in the case of receiving the hybrid automatic repeat request incorrect-receipt indication message;

means for using said dynamic service channel resources to retransmit said real-time service packet; and means for receiving a hybrid automatic repeat request correct-receipt indication message which indicates that said retransmitted real-time service packet is correct, or receiving from a hybrid automatic repeat request incorrect-receipt indication message which indicates that said retransmitted real-time service packet is incorrect.

By virtue of at least one of the above mentioned technical schemes, through allocating the semi-static service channel resources to the terminal to perform the HARQ initial transmission of the real-time service packets as well as allocating the dynamic service channel resources to the terminal to perform the HARQ retransmission of the real-time service packets, the present invention can ensure the real time of the of the service transmission and reduce the control signaling overhead during the service transmission, thereby ensuring the QoS requirements of services.

Other characteristics and advantages of the present invention will be discussed in the subsequent description, part of which will become obvious via the description or become understood via the embodiments of the present invention. The purpose and other advantages of the present invention can be achieved and acquired through the description, claims and the structure specially illustrated in the attached drawings.

BRIEF DESCRIPTION OF THE DRAWINGS

The attached drawings are used to provide further understanding about the present invention, constitute a part of the description and are used together with the embodiments of the present invention to explain the present invention, and do not constitute any limitation on the present invention. Among the drawings:

FIG. 1 is a schematic diagram illustrating the timing relationship among HS-SCCH, HS-PDSCH and HS-SICH channels in the HSDPA technology in a TD-SCDMA system based on related technologies;

FIG. 2 is a schematic diagram illustrating the structure of data field information carried by an HS-SCCH based on related technologies;

FIG. 3 is a schematic diagram illustrating the timing relationship among E-AGCH, E-PUCH and E-HICH channels in the HSDPA technology in a TD-SCDMA system based on related technologies;

DETAILED DESCRIPTION

As mentioned above, in the allocation of real-time service transmission resources based on related technologies, there is a problem that the control channel overhead is large and the signaling time delay during reconfiguration of preallocated channel resources is long. Therefore, the embodiments of the present invention provide a resource allocation method for real-time service transmission and a method for uplink/downlink real-time service transmission, which is capable of overcoming at least one of the above mentioned problems by allocating different service channel resources for initial transmission and retransmission of HARQ.

The exemplary embodiments of the present invention are described below based on the drawings attached; it should be understood that the exemplary embodiments described here are only used to describe and explain the present invention rather than restrict the present invention. It is necessary to explain that the embodiments in this application and the characteristics in the embodiments can be combined together, if they do not contradict to each other.

Method Embodiment One

Based on this embodiment of the present invention, a resource allocation method for real-time service transmission is provided that is used for a base station to allocate service channel resources of the real-time service transmission to a terminal; wherein, there are resource allocation control channels existing between the terminal and the base station.

Specifically, the method may include the following processing:

(I) through the resource allocation control channels, the base station allocates semi-static service channel resources to the terminal to be used for HARQ initial transmission of real-time service packets; wherein, before the base station reconfigures or releases the semi-static service channel resources, the terminal can use the semi-static service channel resources continuously;

(II) through the resource allocation control channels, the base station allocates dynamic service channel resources to the terminal to be used for HARQ retransmission of the real-time service packets; wherein, the terminal can only use the dynamic service channel resources within the allocated time, i.e. can only use the resources once or can only use them in 1 frame or a few short-cycle frames.

Based on the above mentioned contents, the real-time service transmission method provided in this embodiment of the present invention will be further described hereinafter by referring to the HSUPA technology and the HSDPA technology in the TD-SCDMA system; wherein, a typical example of the real-time service is a VoIP service.

Figures 4, 5:
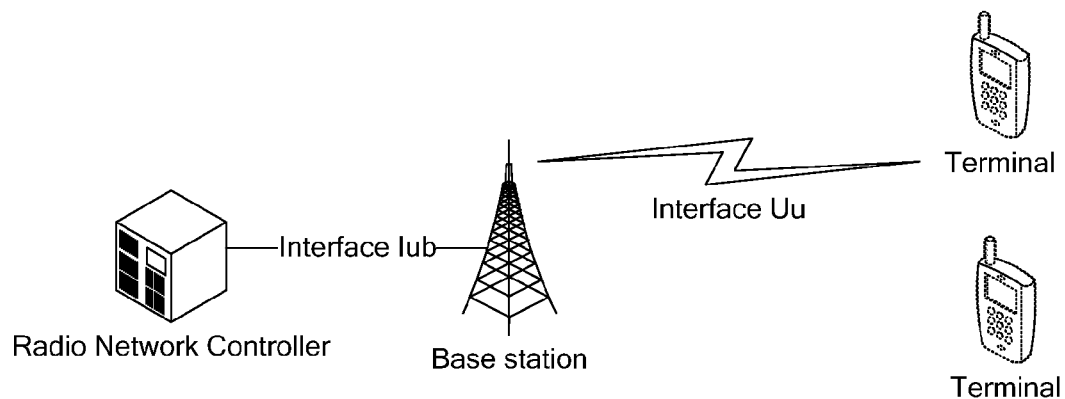
FIG. 4 is a schematic diagram illustrating the structure of data field information carried by an E-AGCH based on related technologies.
FIG. 5 is a schematic diagram illustrating a wireless network system architecture of a TD-SCDMA system used to implement the present invention.

FIG. 5 shows a schematic diagram illustrating a wireless network system of a TD-SCDMA system used to implement the present invention, as shown in FIG. 5, the system includes a network side RNC and a Node B as well as a UE.

Method Embodiment Two

Based on this embodiment of the present invention, an uplink real-time service transmission method is provided that is used to perform uplink real-time service transmission between a terminal and a base station; wherein, there are resource allocation control channels and information feedback control channels existing between the terminal and the base station.

Figure 6:
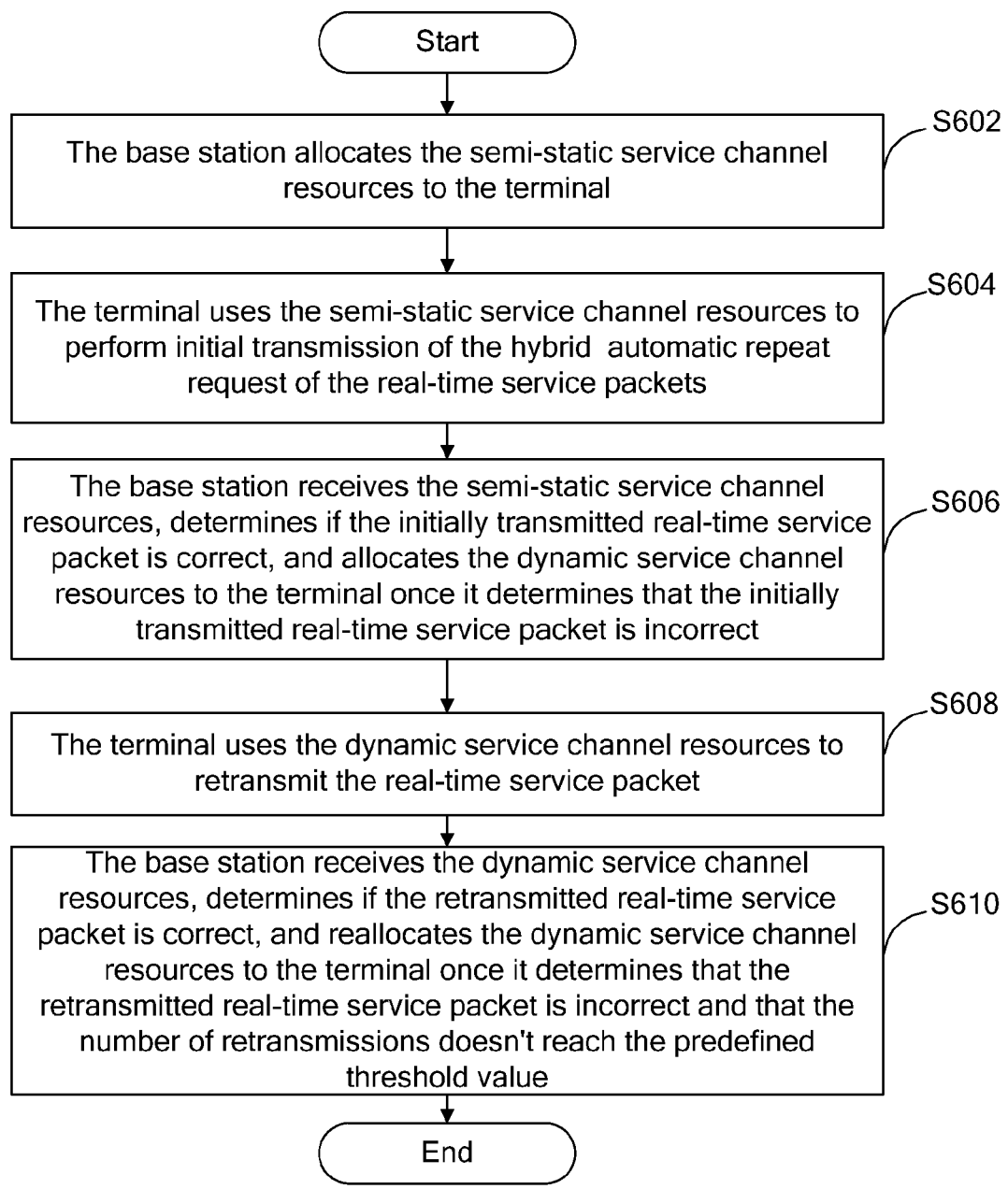
FIG. 6 is a flowchart of an uplink real-time service transmission method according to the second embodiment of the present invention.

FIG. 6 is a flowchart of an uplink real-time service transmission method according to this embodiment of the present invention. As shown in FIG. 6, the uplink real-time service transmission method according to this embodiment of the present invention includes the following processing (step S602-step S610):

step S602, the base station allocates semi-static service channel resources to the terminal; wherein, before the base station reconfigures or releases the semi-static service channel resources, the terminal can use the semi-static service channel resources continuously;

step S604, the terminal uses the semi-static service channel resources to perform HARQ initial transmission of real-time service packets;

step S606, the base station receives the semi-static service channel resources, determines if the initially transmitted real-time service packet is correct, and allocates dynamic service channel resources to the terminal once it determines that the initially transmitted real-time service packet is incorrect;

step S608, the terminal uses the dynamic service channel resources to retransmit the real-time service packets;

step S610, the base station receives the dynamic service channel resources, determines if the retransmitted real-time service packet is correct, and reallocates the dynamic service channel resources to the terminal once it determines the retransmitted real-time service packet is incorrect and the number of retransmissions doesn't reach a predefined threshold value.

Wherein, in the step S608 and the step S610, if the base station determines that the initially transmitted or retransmitted real-time service packet is incorrect, then through the information feedback control channels, the base station sends hybrid automatic repeat request incorrect-receipt indication message to the terminal, and the base station saves the incorrect real-time service packet.

Figure 7:
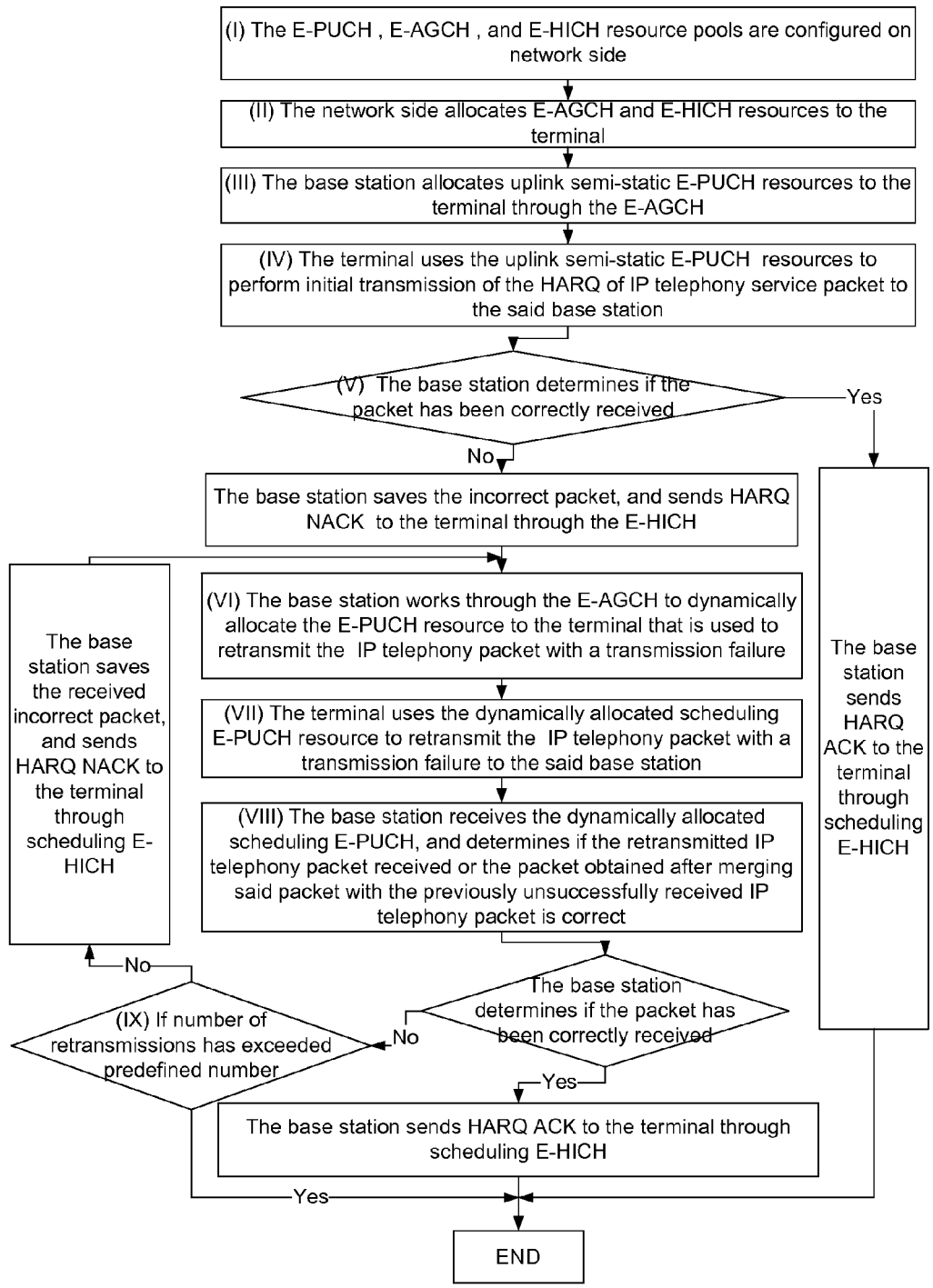
FIG. 7 is a detailed processing flowchart of an uplink real-time service transmission method according to the second embodiment of the present invention.

The above mentioned individual processing steps will be further described hereinafter using the VoIP service as an example. In the HSUPA technology, physical channels E-AGCH and E-HICH correspond, respectively, to the resource allocation control channel along the direction from the base station to the terminal and the information feedback control channel from the base station to the terminal that are related to uplink real-time service transmission, while the E-PUCH corresponds to the service channel. In the MAC layer, it is the MAC-e/es sub-layer and entity that manage and use the above mentioned control channel and service channel resources. The following descriptions can be made on this embodiment of the present invention with reference to FIG. 7:

(I) the E-PUCH, E-AGCH and E-HICH channel resource pools are configured on the network side According to the existing network architecture, i.e. the wireless network is composed of two network elements, an RNC and a Node B, the RNC and the Node B are connected through an interface "Iub"; first, it is the RNC that configures the E-PUCH, E-AGCH and E-HICH channel resource pools, then, it is the RNC that initiates a process of physical shared channel reconfiguration in the NBAP protocol to the Node B through the interface "Iub", and sends these resource configuration information to the Node B.

If the wireless network only has one network element i.e. the Node B, then such a process can be implemented through mutual cooperation among the related functional modules inside the Node B.

During this process, an MAC-e/es sublayer and entity are established in the Node B to schedule and manage these channel resource pools.

(II) the E-AGCH and semi-static E-HICH channel resources are allocated to the UE on the network side The E-AGCH (resource allocation control channel) and semi-static E-HICH (information feedback control channel) channel resources are allocated to the UE on the network side. According to the existing network architecture, it is usually the RNC that determines to allocate HSUPA resources to the UE for service transmission. The RNC initiates a radio link setup process and a synchronous/asynchronous radio link reconfiguration process in the NBAP protocol to the Node B through the interface "Iub", and requests the Node B to allocate the E-AGCH and semi-static E-HICH channel resources to the UE; while the Node B allocates and saves these resources, and then feeds back them to the RNC. If the wireless network on the network side only has one network element, i.e. the Node B, then such processes can be implemented through mutual cooperation among the related functional modules in the Node B.

When the E-AGCH is allocated, it is practical to allocate 1 or more E-AGCH channel resources to the UE. When the semi-static E-HICH channel resources are allocated, it is practical to allocate one semi-static E-HICH channel and one or more signature sequences with one-to-one correspondence to each allocated E-AGCH, or to allocate one semi-static E-HICH channel and one or more signature sequences to the UE to be used as the information feedback control channel resources for the HARQ initial transmission of the VoIP service packets in which the semi-static E-PUCH channel resources are utilized.

The network side sends the above mentioned allocated E-AGCH and semi-static E-HICH channel resources to the UE through the upper layer signaling. According to the existing network architecture, such a process is accomplished through such processes in the RRC protocol as an RRC connection establishment process, a radio bearer establishment process, a radio bearer reconfiguration process, a radio bearer release process, a transport channel reconfiguration process, a physical channels reconfiguration process, and a cell update process, etc, that the RNC initiates to the UE through an interface "Uu" (the interface between the network side and the UE). If the wireless network on the network side only has one network element, i.e. the Node B, then it is the Node B that accomplishes sending the above mentioned resources to the UE through a process similar to the above mentioned process.

(III) the Node B allocates the uplink semi-static E-PUCH channel resources to the UE through the E-AGCH (corresponding to the above mentioned step S602)

The Node B, when allocating the semi-static E-PUCH channel resources to the UE through the E-AGCH (i.e. the resource allocation control channel), is required to explicitly indicate and differentiate that the Node B dynamically allocates the uplink E-PUCH channel resources through the E-AGCH during scheduling transmission in the existing HSUPA technology.

What is different from the Node B's dynamical allocation of the uplink E-PUCH channel resources through the E-AGCH during scheduling transmission in the existing HSUPA technology is that, the UE can, once having received the grant, continuously use the semi-static E-PUCH channel resources allocated through the E-AGCH, until the Node B reconfigures the semi-static E-PUCH channel resources or releases the semi-static E-PUCH channel resources through the E-AGCH. Wherein, the semi-static E-PUCH channel can be either continuous or periodical in a subframe or a frame.

In the existing E-AGCH information structure shown in FIG. 4, the resource durability indicator (RDI) information has the power to grant multiple TTIs, but the power defined presently is still unable to support relatively long-lasting continuous granting. Therefore, it is necessary to enhance or modify the definition of the RDI, or enhance or modify the information structure of the E-AGCH channel.

One potential enhancement method is: allocating the E-PUCH channel resources based on a repeat period and a repeat length after a predefined time by using the sent and received subframe or frame of the E-AGCH as a reference; wherein, the repeat period and the repeat length are allocated by the Node B and sent to the UE through the E-AGCH. In the TD-SCDMA system, the presently defined repeat period can take values of 1, 2, 4, 8, 16, 32 and 64, while the repeat length available for each repeat period can respectively be 1, 2, 4, 8, 16, 32 and 64, presenting a total of 127 kinds. A part or all of these 127 kinds can be sorted into a table, with each of them being assigned an index number. Such a table is saved in the Node B and the UE as system parameters, the Node B allocates the repeat period and the repeat length and sends their corresponding index numbers to the UE through the E-AGCH, and the UE obtains the allocated repeat period and repeat length by looking up the index numbers in the table. In this way, it is necessary to include the index numbers in the information structure of the E-AGCH channel.

(IV) the UE uses the uplink semi-static E-PUCH channel resources to perform the HARQ initial transmission of the VoIP service packets to the Node B (corresponding to the above mentioned step S604);

In general, the packet of the VoIP service is periodical, with one new packet generated every 20 ms. Therefore, it is practical to use 20 ms as a period to allocate the semi-static E-PUCH channel resources of one or more subframes or frames to the UE. In this way, the UE can transmit on the uplink one new packet generated every 20 ms to the Node B, and new uplink packets of all VoIP services are sent to the Node B through the HARQ initial transmission performed via the semi-static E-PUCH channels.

(V) the Node B receives the semi-static E-PUCH channel (corresponding to the above mentioned step S606)

The Node B determines if the received VoIP service packet has been received correctly, if it has been received correctly, then the Node B sends an HARQ ACK message to the UE through the semi-static E-HICH channel, and transmission of the packet is complete; if it has been received incorrectly, then the Node B saves the incorrect packet, and sends an HARQ NACK message to the UE through the semi-static E-HICH channel.

Specifically, the Node B receives the semi-static E-PUCH channel sent by each UE based on the semi-static E-PUCH channel resources allocated in above mentioned (III) to determine if the VoIP service packet has been received correctly. If it has been received correctly, then the Node B sends the HARQ ACK (receipt-correct) message to the UE through the semi-static E-HICH channel, and such data transmission is complete. If it has been received incorrectly, then the Node B sends the HARQ NACK (receipt-incorrect) message to the UE through the semi-static E-HICH channel, and performs the following processing (VI).

Wherein, the E-HICH channel being used can, corresponding to the two allocation methods in above mentioned (III), uses one semi-static E-HICH channel and one or more signature sequences that correspond to the E-AGCH of the granted semi-static E-PUCH channel resources, or uses one semi-static E-HICH channel and one or more signature sequences allocated to the UE.

(VI) the Node B dynamically allocates the scheduling E-PUCH resources to the UE through the E-AGCH for retransmitting the VoIP packets with transmission failures (corresponding to the above mentioned step S606)

For each incorrectly received VoIP packet, the Node B always uses the scheduling and transmission method in the existing HSUPA technology, and dynamically allocates the scheduling E-PUCH resources through the E-AGCH to the UE for retransmitting the VoIP packet.

In the HSUPA technology of the TD-SCDMA system, in order to distinguish common scheduling transmission from retransmission, the Node B must explicitly instruct the UE when working through the E-AGCH to dynamically allocate the scheduling E-PUCH resources to retransmit the VoIP packets with transmission failures. For example, it enables the UE to distinguish the specific purpose of the scheduling E-PUCH resources allocated by the E-AGCH through adding new signaling information onto the E-AGCH channel, or performing specific processing to some contents on the E-AGCH channel, or performing modification and enhancement to the information in the existing information structure.

(VII) the UE uses the dynamically allocated scheduling E-PUCH resources to retransmit the VoIP packets with transmission failures to the Node B (corresponding to the above mentioned step S608);

In the HSUPA technology of the TD-SCDMA system, each TTI can only transmit one packet. Therefore, on the UE side, if the E-PUCH resource dynamically allocated by a TTI through the E-AGCH is explicitly instructed to be used to perform retransmission of the VoIP service packet, then the UE uses the dynamically allocated scheduling E-PUCH resource to retransmit a VoIP service packet previously failed in transmission to the Node B.

(VIII) the Node B receives the dynamically allocated scheduling E-PUCH channels (corresponding to the above mentioned step S610)

The Node B determines if the received retransmitted VoIP packet or the packet merging this received packet with the previously incorrectly received VoIP packet is correct; if it has been received correctly, then the Node B sends an HARQ ACK message to the UE through the scheduling E-HICH channel, and the transmission of the packet is complete; if it has been received incorrectly, then the Node B saves the received incorrect packet, and sends an HARQ NACK message to the UE through the scheduling E-HICH channel, and then performs the subsequent processing (IX).

Specifically, in the Node B, if the scheduling E-PUCH previously allocated to the UE is explicitly instructed to be used to perform retransmission of the VoIP packet, then after receiving the scheduling E-PUCH channel, the Node B determines if the VoIP service packet has been received correctly, or after merging the received retransmitted data with the previously incorrectly received data, determines if the merged VoIP service packet has been received correctly. Then, the Node B uses the scheduling and transmission method in the existing HSUPA technology, if it has been received correctly, then the Node B sends an HARQ ACK message to the UE through the scheduling E-HICH channel and signature sequences to which the scheduling E-PUCH channel corresponds to, and such data transmission is complete. If it still has been received incorrectly, then the Node B saves the incorrect data, and sends an HARQ NACK message to the UE through the scheduling E-HICH channel to which the scheduling E-PUCH channel corresponds to, and then performs the subsequent processing (IX). At this moment, the saved incorrect data can be the data obtained after the merger processing, or can also be the previously incorrectly received data and the newly incorrectly received data that have been saved separately.

(IX) the base station determines if the number of retransmissions of the VoIP service packet has reached a certain predefined threshold value, if the determining result is negative, then the base station proceeds to the above mentioned processing (VI) (corresponding to the above mentioned step S610);

Specifically, if the retransmission fails, then the Node B determines if the number of retransmissions of the VoIP service packet has exceeded a certain predefined threshold value. The predefined threshold value is configured by the RNC or the Node B to the Node B and the UE during initial establishment of the service, i.e. during processing (II). If the number of retransmissions has reached the predefined number of retransmissions, but the VoIP packet still has not been correctly received by the Node B, then the transmission process of the VoIP packet ends, and in the UE, the VoIP packet is discarded; otherwise, the Node B proceeds to the processing (VI).

Method Embodiment Three

Based on this embodiment of the present invention, a downlink real-time service transmission method is provided that is used to perform downlink real-time service transmission between a terminal and a base station; wherein, there are resource allocation control channels and information feedback control channels existing between the terminal and the base station.

Figure 8:
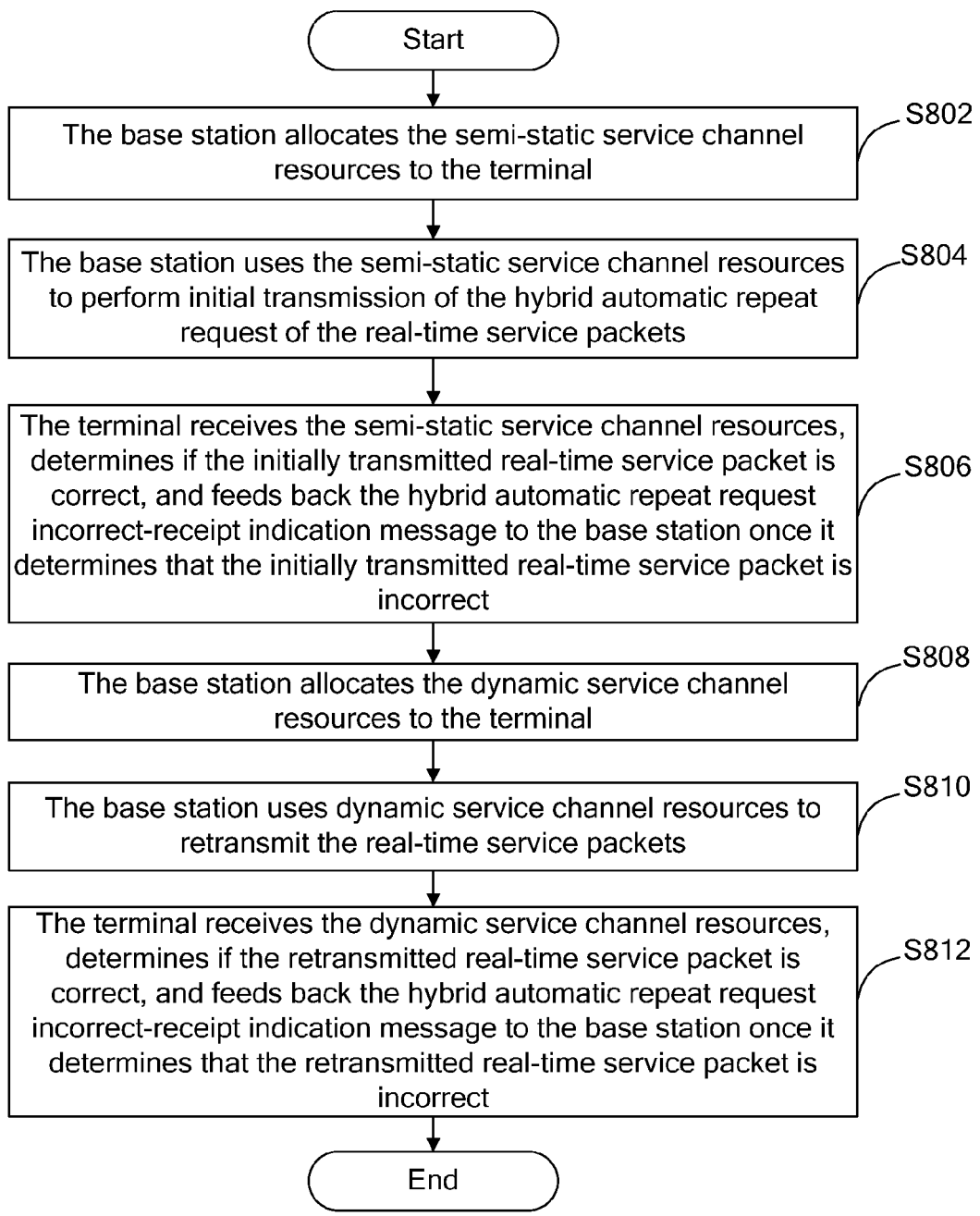
FIG. 8 is a flowchart of a downlink real-time service transmission method according to the third embodiment of the present invention.

FIG. 8 is a flowchart of a downlink real-time service transmission method according to this embodiment of the present invention. As shown in FIG. 8, the downlink real-time service transmission method according to this embodiment of the present invention includes the following processing (step S802-step S810):

step S802, the base station allocates semi-static service channel resources to the terminal; wherein, before the base station reconfigures or releases the semi-static service channel resources, the terminal can use the semi-static service channel resources continuously;

step S804, the base station uses the semi-static service channel resources to perform HARQ initial transmission of real-time service packets;

step S806, the terminal receives the semi-static service channel resources, determines if the initially transmitted real-time service packet is correct, and feeds back an HARQ incorrect-receipt indication message to the base station once it determines that the initially transmitted real-time service packet is incorrect;

step S808, the base station allocates dynamic service channel resources to the terminal;

step S810, the base station uses the dynamic service channel resources to retransmit the real-time service packets;

step S812, the terminal receives the dynamic service channel resources, determines if the retransmitted real-time service packet is correct, and feeds back the HARQ incorrect-receipt indication message to the base station once it determines that the retransmitted real-time service packet is incorrect;

In the step S806 and the step S812, if the terminal determines that the initially transmitted or retransmitted real-time service packet is incorrect, then through the information feedback control channel, the terminal sends the hybrid automatic repeat request incorrect-receipt indication message to the base station, and the terminal saves the incorrect real-time service packet.

Figure 9:
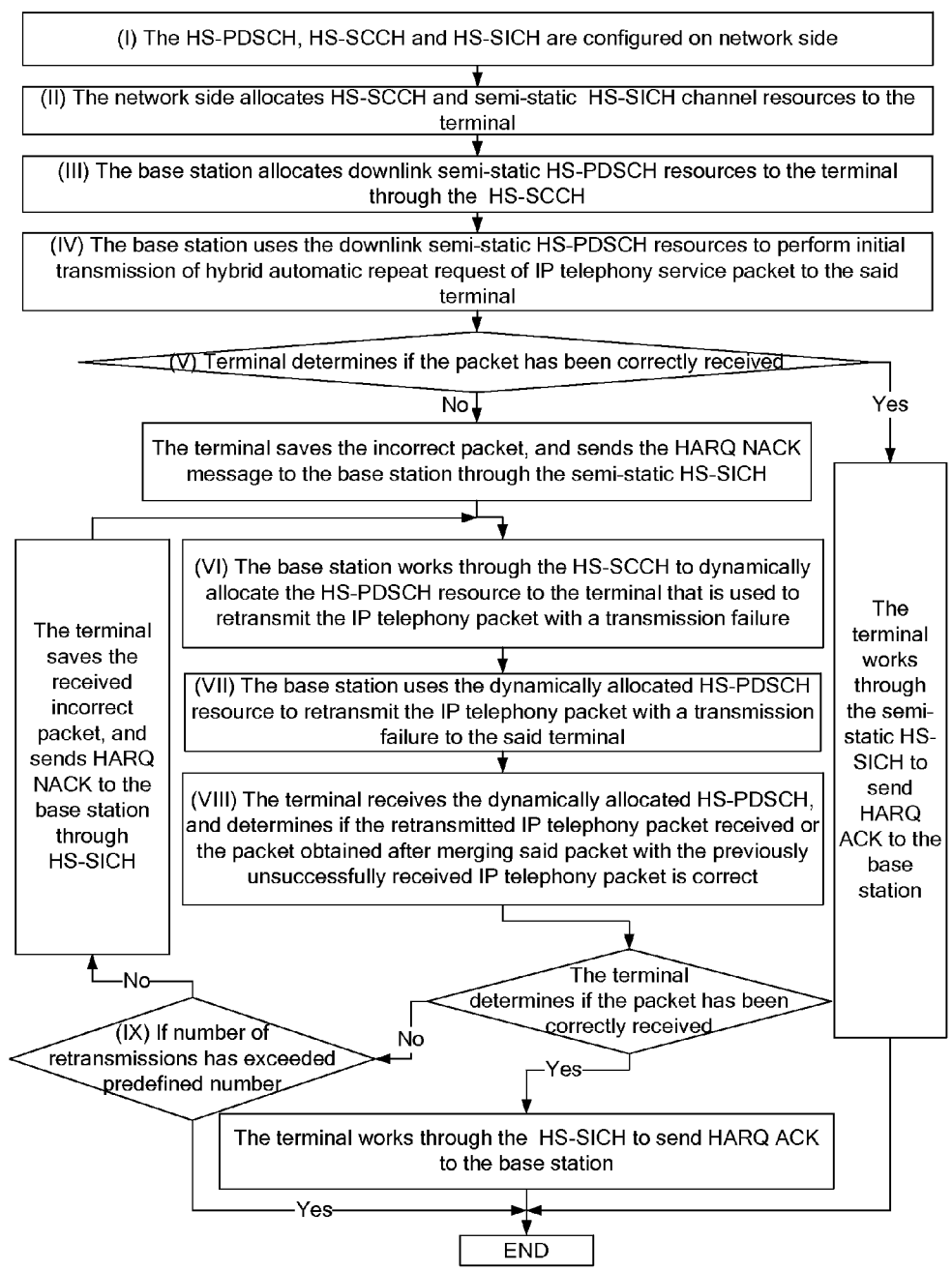
FIG. 9 is a detailed processing flowchart of a downlink real-time service transmission method according to the third embodiment of the present invention.

The following will further describe the individual processing steps in this embodiment using a VoIP service as an example. In the HSDPA technology of the TD-SCDMA system, wherein, physical channels HS-SCCH and HS-SICH correspond, respectively, to the resource allocation control channel along the direction from the base station to the terminal and the information feedback control channel from the terminal to the base station that are related to downlink real-time service transmission, while the HS-PDSCH corresponds to the service channel. In the MAC layer, it is the MAC-hs sub-layer and entity that manage and use the above mentioned control channel and service channel resources. The following descriptions about this embodiment of the present invention can be provided with reference to FIG. 9:

(I) the HS-PDSCH, HS-SCCH and HS-SICH channel resource pools are configured on the network side According to the existing network architecture, i.e. the wireless network is composed of two network elements, an RNC and a Node B, the RNC and the Node B are connected through an interface "Iub"; first, it is the RNC that configures the HS-PDSCH, HS-SCCH and HS-SICH channel resource pools; then, it is the RNC that initiates a physical shared channel reconfiguration process in the NBAP protocol to the Node B through the interface "Iub" to send these resource configuration information to the Node B.

If the wireless network only has one network element, i.e. the Node B, then such a process can be implemented through mutual cooperation among the related functional modules inside the Node B.

During this process, an MAC-hs sublayer and entity is established inside the Node B to schedule and manage these channel resource pools.

(II) the HS-SCCH and semi-static HS-SICH channel resources are allocated on the network side to the UE The HS-SCCH and semi-static HS-SICH channel resources are allocated to the UE on the network side. According to the existing network architecture, it is usually the RNC that determines to allocate HSDPA resources to the UE for service transmission. The RNC initiates a radio link setup process and a synchronous/asynchronous radio link reconfiguration process in the NBAP protocol to the Node B through the interface "Iub", and requests the Node B to allocate the HS-SCCH and semi-static HS-SIGH channel resources to the UE, while the Node B allocates and saves these resources, and then feeds back them to RNC. If the wireless network on the network side only has one network element, i.e. the Node B, then such processes can be implemented through mutual cooperation among the related functional modules inside the Node B.

When the HS-SCCH is allocated, it is practical to allocate 1 or more HS-SCCH channel resources to the UE. When the semi-static HS-SIGH channel resources are allocated, it is practical to allocate a semi-static HS-SIGH channel with one-to-one correspondence to each allocated HS-SCCH, or to allocate semi-static HS-SIGH channels to the UE to be used as the information feedback control channel resources during HARQ initial transmission of the VoIP service packets in which the semi-static HS-PDSCH channel resources are utilized.

The network side sends the above mentioned allocated HS-SCCH and semi-static HS-SIGH channel resources to the UE through the upper layer signaling. According to the existing network architecture, such a process is accomplished through such processes in the RRC protocol as an RRC connection establishment process, a radio bearer establishment process, a radio bearer reconfiguration process, a radio bearer release process, a transport channel reconfiguration process, a physical channel reconfiguration process, and a cell update process, etc, that the RNC initiates to the UE through an interface "Uu" (the interface between the network side and the UE). If the wireless network on the network side only has one network element, i.e. the Node B, then it is the Node B that accomplishes sending the above mentioned resources to the UE through a process similar to the above mentioned process.

(III) the Node B allocates the downlink semi-static HS-PDSCH channel resources to the UE through the HS-SCCH (corresponding to the above mentioned step S802)

The Node B, when allocating the semi-static HS-PDSCH channel resources to the UE through the HS-SCCH (i.e. the resource allocation control channel), is required to explicitly indicate and differentiate that the Node B dynamically allocates the downlink HS-PDSCH channel resources through the HS-SCCH in the existing HSDPA technology. What is different from Node B's dynamical allocation of the downlink HS-PDSCH channel resources through the HS-SCCH in the existing HSUPA technology is that, by allocating the semi-static HS-PDSCH channel resources through the HS-SCCH, the UE can use the allocation information continuously after receiving it, until the Node B reconfigures the semi-static HS-PDSCH channel resources or releases the semi-static HS-PDSCH channel resources through the HS-SCCH. Wherein, the semi-static HS-PDSCH channels can be either continuous or periodical in a subframe or a frame. The information in the existing HS-SCCH information structure as shown in FIG. 2 can not be granted continuously. Therefore, it is necessary to enhance or modify the information structure of the HS-SCCH channel.

One potential enhancement method is: allocating the HS-PDSCH channel resources based on a repeat period and a repeat length after a predefined time by using the sent and received subframe or frame of the HS-SCCH as a reference; wherein, the repeat period and the repeat length are allocated by the Node B and sent to the UE through the HS-SCCH. In the TD-SCDMA system, the presently defined repeat period can take values of 1, 2, 4, 8, 16, 32 and 64, while the repeat length available for each repeat period can respectively be 1, 2, 4, 8, 16, 32 and 64, presenting a total of 127 kinds. A part or all of these 127 kinds can be sorted into a table, with each of them being assigned an index number. Such a table is saved in the Node B and the UE as system parameters, the Node B allocates the repeat period and the repeat length and sends their corresponding index numbers through the HS-SCCH to the UE, and the UE obtains the allocated repeat period and repeat length by looking up the index numbers in the table. In this way, it is necessary to include the index numbers in the information structure of the HS-SCCH channel.

(IV) the Node B uses the downlink semi-static HS-PDSCH channel resources to perform the HARQ initial transmission of the VoIP service packets to the UE (corresponding to the above mentioned step S804)

In general, the packet of the VoIP service is periodical, with one new packet generated every 20 ms. Therefore, it is practical to use 20 ms as a period to allocate the semi-static HS-PDSCH channel resources of one or more subframes or frames to the UE. In this way, the Node B can transmit on the downlink one new packet generated every 20 ms to the UE, and new downlink packets of all VoIP services are sent to the UE through the HARQ initial transmission performed via the semi-static HS-PDSCH channels.

(V) the UE receives the semi-static HS-PDSCH channels (corresponding to step S806)

The UE determines if the received VoIP service packet has been received correctly, if it has been received correctly, then the UE sends an HARQ ACK message to the Node B through the semi-static HS-SICH channel, and the transmission of the packet is complete; if it has been received incorrectly, then the UE saves the incorrect packet, and sends an HARQ NACK message to the Node B through the semi-static HS-SICH channel, and performs the processing (VI).

The UE receives the semi-static HS-PDSCH channels sent by the Node B based on the semi-static HS-PDSCH channel resources allocated in processing (III) of this embodiment, and determines if the VoIP service packet has been correctly received. If it has been received correctly, then the UE sends an HARQ ACK (receipt-correct) message through the semi-static HS-SICH channel to the Node B, and such data transmission is complete. If it has been received incorrectly, then the UE sends an HARQ NACK (receipt-incorrect) message through the semi-static HS-SICH channel to the Node B, and proceeds to the following processing (VI).

Wherein, the HS-SICH channel being used can, corresponding to the two allocation methods in above mentioned processing (III) of this embodiment, use one semi-static HS-SICH channel that corresponds to the HS-SCCH of the granted semi-static HS-PDSCH channel resources, or use one semi-static HS-SICH channel allocated to the UE.

(VI) the Node B dynamically allocates the HS-PDSCH resources to the UE through the HS-SCCH for retransmitting the VoIP packets with transmission failures (corresponding to step S808);

For each incorrectly received VoIP packet, the Node B always, by using the scheduling and transmission method in the existing HSDPA technology and dynamically, allocates the HS-PDSCH resources to the UE for retransmitting the VoIP packet through the HS-SCCH.

(VII) the Node B uses the dynamically allocated HS-PDSCH resources to retransmit the VoIP packets with transmission failures to the UE (corresponding to step S810);

(VIII) the UE receives the dynamically allocated HS-PDSCH channels (corresponding to step S812);

The UE determines if the received retransmitted VoIP packet or the packet merging the received packet with the previously incorrectly received VoIP packet is correct, if it has been received correctly, then the UE sends an HARQ ACK message to the Node B through the HS-SICH channel, and the transmission of the packet is complete; if it has been received incorrectly, then the UE saves the received incorrect packet, and sends an HARQ NACK message to the Node B through the HS-SICH channel, and then performs the subsequent processing (IX) of this embodiment.

Specifically, after receiving the dynamically allocated HS-PDSCH channel, the UE determines if the VoIP service packet has been correctly received, or after merging the received retransmission data with the previously incorrectly received data, determines if the merged VoIP service packet has been received correctly. Then, according to the method in the existing HSDPA technology, if it has been correctly received, then the UE sends an HARQ ACK message to the Node B through the HS-SICH channel that corresponds to the HS-SCCH channel which has dynamically allocated the HS-PDSCH channel resources, and such data transmission is complete. If it still is incorrectly received, then the UE saves the incorrect data, and sends an HARQ NACK message to the Node B through the HS-SICH channel that corresponds to the HS-SCCH channel which has dynamically allocated the HS-PDSCH channel resources, and performs the following processing (IX). At this moment, the saved incorrect data can be the data obtained after the merger processing, or can also be the previously incorrectly received data and the newly incorrectly received data that have been saved separately.

(IX) the base station determines if the number of retransmissions of the VoIP service packet has reached a certain predefined threshold value, if so, then transmission of the packet is complete; if not, then the base station proceeds to the above mentioned processing (VI) of this embodiment;

If the retransmission fails, then the Node B determines if the number of retransmission of the VoIP service packet has exceeded a certain predefined threshold value. The predefined threshold value is generally configured by the RNC or the Node B to the Node B and the UE during initial establishment of the service, i.e. during the above mentioned processing (II) of this embodiment. If the number of retransmissions has reached the predefined number of retransmissions, but the VoIP packet still has not been correctly received by the UE, then the transmission process of the VoIP packet ends, and in the Node B, the VoIP packet is discarded; otherwise, the Node B proceeds to the above mentioned processing (VI) of this embodiment.

It can be seen from the above descriptions that in the embodiments of the present invention, through allocating semi-static service channel resources to the terminal to perform the HARQ initial transmission of the real-time service packets as well as allocating the dynamic service channel resources to the terminal to perform the HARQ retransmission of the real-time service packets, the present invention can ensure the real time of the service transmission and reduce the control signaling overhead during the service transmission, thereby ensuring the QoS requirements of services and being able to timely reconfigure the semi-static service channel resources through the resource allocation control channels.

Obviously, it should be understood for those skilled in the art that the individual modules or individual steps in the present invention as mentioned above can be realized by using a general computing device and that, they can be either integrated in a single computing device or distributed in a network composed of multiple computing devices and that, optionally, they can be realized using executable program codes in such a computing device, thus they can be stored inside a storage device and executed by a computing device, or they can be individually made into individual integrated circuit modules, or they can be realized by making multiple modules or steps in them into one integrated circuit modules. In this way, the present invention is not restricted to any specific combination of hardware and software.

The above mentioned are just the preferred exemplary embodiments of the present invention and are not used to limit the present invention; for those skilled in the art, the present invention can have various changes and variations. Any and all modifications, equivalent substitutions, and improvements, etc, made within the spirit and principle of the present invention shall all be included into the scope of the protection of the present invention.

What is claimed is:

1. A resource allocation method for real-time service transmission, being used by a base station to allocate service channel resources to a terminal for the real-time service transmission, wherein, there are resource allocation control channels existing between said terminal and said base station, the method comprising:

through said resource allocation control channels, said base station allocating semi-static service channel resources to said terminal to be used for initial transmission of hybrid automatic repeat request of real-time service packets; wherein, before said base station reconfigures or releases said semi-static service channel resources, said terminal being capable of using said semi-static service channel resources continuously; and through said resource allocation control channels, said base station allocating dynamic service channel resources to said terminal to be used for retransmission of hybrid automatic repeat request of real-time service packets; wherein, said terminal using said dynamic service channel resources only within the allocated time, wherein, under the condition that said base station determines that an initially transmitted or retransmitted real-time service packet is correct, it sends a hybrid automatic repeat request correct-receipt indication message to said terminal through an information feedback control channel.

2. An uplink real-time service transmission method, being used to perform uplink real-time service transmission between a terminal and a base station, wherein, there are resource allocation control channels and information feedback control channels existing between said terminal and said base station, the method comprising:

said base station allocating semi-static service channel resources to said terminal; wherein, before said base station reconfigures or releases said semi-static service channel resources, said terminal being capable of using said semi-static service channel resources continuously;

said terminal using said semi-static service channel resources to perform initial transmission of hybrid automatic repeat request of real-time service packets;

said base station receiving said semi-static service channel resources, determining if said initially transmitted real-time service packet is correct, and allocating dynamic service channel resources to said terminal once it determines that said initially transmitted real-time service packet is incorrect;

said terminal using said dynamic service channel resources to retransmit said real-time service packet; and said base station receiving said dynamic service channel resources, determining if said retransmitted real-time service packet is correct, and reallocating dynamic service channel resources to said terminal once it determines that said retransmitted real-time service packet is incorrect and that the number of retransmissions doesn't reach a predefined threshold value, wherein, under the condition that said base station determines that said initially transmitted or retransmitted real-time service packet is correct, it sends a hybrid automatic repeat request correct-receipt indication message to said terminal through said information feedback control channel.

3. The uplink real-time service transmission method according to claim 2, wherein, said base station allocates said semi-static service channel resources and said dynamic service channel resources through said resource allocation control channels.

4. The uplink real-time service transmission method according to claim 2, wherein, under the condition that said base station determines that said initially transmitted or retransmitted real-time service packet is incorrect, the method further comprising:

said base station sending a hybrid automatic repeat request incorrect-receipt indication message to said terminal through said information feedback control channel;

said base station saving said incorrect real-time service packet.

5. The uplink real-time service transmission method according to claim 4, wherein, said operation for determining if said retransmitted real-time service packet is correct specifically comprises:

said base station determines if said retransmitted real-time service packet received is correct; or said base station determines if a packet obtained after merging said retransmitted real-time service packet received with said previously saved real-time service packet incorrectly received is correct.

6. The uplink real-time service transmission method according to claim 2, wherein, said information feedback control channels are allocated through the following operation:

semi-static information feedback control channels are allocated to said terminal through the resource allocation control channels used to allocate said semi-static service channel resources; wherein, there is one-to-one correspondence between said semi-static information feedback control channel and said resource allocation control channel.

7. The uplink real-time service transmission method according to claim 2, wherein, said information feedback control channels are allocated through the following operation:

through an upper layer signaling, semi-static information feedback control channels are allocated to said terminal.

8. A downlink real-time service transmission method, being used to perform downlink real-time service transmission between a terminal a base station, wherein, there are resource allocation control channels and information feedback control channels existing between said terminal and said base station, the method comprising:

said base station allocating semi-static service channel resources to said terminal; wherein, before said base station reconfigures or releases said semi-static service channel resources, said terminal being capable of using said semi-static service channel resources continuously;

said base station using said semi-static service channel resources to perform initial transmission of hybrid automatic repeat request of real-time service packets;

said terminal receiving said semi-static service channel resources, determining if said initially transmitted real-time service packet is correct, and feeding back a hybrid automatic repeat request incorrect-receipt indication message to said base station once it determines that said initially transmitted real-time service packet is incorrect;

said base station allocating dynamic service channel resources to said terminal;

said base station using said dynamic service channel resources to retransmit said real-time service packet; and said terminal receiving said dynamic service channel resources, determining if said retransmitted real-time service packet is correct, and feeding back a hybrid automatic repeat request incorrect-receipt indication message to said base station once it determines that said retransmitted real-time service packet is incorrect, wherein, under the condition that said terminal determines that said initially transmitted or retransmitted real-time service packet is correct, it sends a hybrid automatic repeat request correct-receipt indication message to said base station through said information feedback control channel.

9. The downlink real-time service transmission method according to claim 8, wherein, said base station allocates said semi-static service channel resources and said dynamic service channel resources through said resource allocation control channels.

10. The downlink real-time service transmission method according to claim 8, wherein, under the condition that said terminal determines that said initially transmitted or retransmitted real-time service packet is incorrect, the method further comprising:

said terminal sending the hybrid automatic repeat request incorrect-receipt indication message to said base station through said information feedback control channel;

said terminal saving said incorrect real-time service packet.

11. The downlink real-time service transmission method according to claim 10, wherein, said operation for determining if said retransmitted real-time service packet is correct comprises:

said terminal determines if said retransmitted real-time service packet received is correct; or
said terminal determines if a packet obtained after merging said retransmitted real-time service packet received with said previously saved real-time service packet incorrectly received is correct.

12. The downlink real-time service transmission method according to claim 8, wherein, under the condition that said terminal determines that said retransmitted real-time service packet is incorrect and feeds back the hybrid automatic repeat request incorrect-receipt indication message to said base station, if said base station determines that the number of retransmissions does not reach a predefined threshold value, then it reallocates dynamic service channel resources to said terminal.

13. The downlink real-time service transmission method according to claim 8, wherein, said information feedback control channels are allocated through the following operation:

semi-static information feedback control channels are allocated to said terminal through the resource allocation control channels used to allocate said semi-static service channel resources; wherein, said semi-static information feedback control channels are one-to-one correspondent to said resource allocation control channels.

14. The downlink real-time service transmission method according to claim 8, wherein, said information feedback control channels are allocated through the following operation:

through an upper layer signaling, semi-static information feedback control channels are allocated to said terminal.

15. The method according to claim 1, wherein, said continuously used method includes: continuous use and/or periodical use in terms of time.

16. The method according to claim 2, wherein, said continuously used method includes: continuous use and/or periodical use in terms of time.

17. The method according to claim 8, wherein, said continuously used method includes: continuous use and/or periodical use in terms of time.

18. A resource allocation method for real-time service transmission, comprising:

allocating semi-static service channel resources to a terminal through resource allocation control channels, wherein said semi-static service channel resources are used continuously by said terminal for initial transmission of hybrid automatic repeat request of real-time service packets before being reconfigured or released;
allocating dynamic service channel resources to said terminal through said resource allocation control channels, wherein said dynamic service channel resources are used by said terminal for retransmission of hybrid automatic repeat request of real-time service packets only within allocated time; and
sending a hybrid automatic repeat request correct-receipt indication message to said terminal through an information feedback control channel under the condition that an initially transmitted or retransmitted real-time service packet is determined correct.

19. An uplink real-time service transmission method comprising:

allocating semi-static service channel resources to said terminal; wherein said semi-static service channel resources are used by said terminal continuously before being reconfigured or released;
receiving from said terminal said semi-static service channel resources for performing initial transmission of hybrid automatic repeat request of real-time service packets;
determining if said initially transmitted real-time service packet is correct, and allocating dynamic service channel resources to said terminal when said initially transmitted real-time service packet is determined to be incorrect;
receiving from said terminal said dynamic service channel resources for retransmitting said real-time service packet;
determining if said retransmitted real-time service packet is correct, and reallocating dynamic service channel resources to said terminal when said retransmitted real-time service packet is determined incorrect and the number of retransmissions doesn't reach a predefined threshold value; and
sending a hybrid automatic repeat request correct-receipt indication message to said terminal through an information feedback control channel under the condition that said initially transmitted or retransmitted real-time service packet is determined correct.

20. The uplink real-time service transmission method according to claim 19, wherein said semi-static service channel resources and said dynamic service channel resources are allocated through resource allocation control channels.

21. The uplink real-time service transmission method according to claim 19, further comprising: under the condition that said initially transmitted or retransmitted real-time service packet is determined incorrect, sending a hybrid automatic repeat request incorrect-receipt indication message to said terminal through an information feedback control channel; and
saving said incorrect real-time service packet.

22. The uplink real-time service transmission method according to claim 21, wherein, said operation for determining if said retransmitted real-time service packet is correct specifically comprises:

determining if said retransmitted real-time service packet received is correct; or
determining if a packet obtained after merging said retransmitted real-time service packet received with said previously saved real-time service packet incorrectly received is correct.

23. The uplink real-time service transmission method according to claim 19, wherein, said information feedback control channel is allocated through the following operation:

a semi-static information feedback control channel is allocated to said terminal through the resource allocation control channel used to allocate said semi-static service channel resources; wherein, there is one-to-one correspondence between said semi-static information feedback control channel and said resource allocation control channel.

24. The uplink real-time service transmission method according to claim 19, wherein, said information feedback control channel is allocated through the following operation:

a semi-static information feedback control channels is allocated to said terminal through an upper layer signaling.

25. A downlink real-time service transmission method, comprising:

allocating semi-static service channel resources to said terminal; wherein, said semi-static service channel resources are used by said terminal continuously before being reconfigured or released;

using said semi-static service channel resources to perform initial transmission of hybrid automatic repeat request of real-time service packets;

through an information feedback control channel, receiving from said terminal a hybrid automatic repeat request correct-receipt indication message which indicates that said initially transmitted real-time service packet is correct, or receiving from said terminal a hybrid automatic repeat request incorrect-receipt indication message which indicates that said initially transmitted real-time service packet is incorrect;

allocating dynamic service channel resources to said terminal in the case of receiving the hybrid automatic repeat request incorrect-receipt indication message from said terminal;

using said dynamic service channel resources to retransmit said real-time service packet;

through the information feedback control channel, receiving from said terminal a hybrid automatic repeat request correct-receipt indication message which indicates that said retransmitted real-time service packet is correct, or receiving from said terminal a hybrid automatic repeat request incorrect-receipt indication message which indicates that said retransmitted real-time service packet is incorrect; and reallocating dynamic service channel resources to said terminal under the condition that said hybrid automatic repeat request incorrect-receipt indication message is received from said terminal and the number of retransmissions does not reach a predefined threshold value.

26. The downlink real-time service transmission method according to claim 25, wherein, said semi-static service channel resources and said dynamic service channel resources are allocated through resource allocation control channels.

27. The downlink real-time service transmission method according to claim 25, wherein, said information feedback control channel is allocated through the following operation:
a semi-static information feedback control channel is allocated to said terminal through the resource allocation control channel used to allocate said semi-static service channel resources; wherein, said semi-static information feedback control channel is one-to-one correspondent to said resource allocation control channel.

28. The downlink real-time service transmission method according to claim 25, wherein, said information feedback control channel is allocated through the following operation:
a semi-static information feedback control channel is allocated to said terminal through an upper layer signaling.

29. The method according to claim 18, wherein, said continuously used method includes: continuous use and/or periodical use in terms of time.

30. The method according to claim 19, wherein, said continuously used method includes: continuous use and/or periodical use in terms of time.

31. The method according to claim 25, wherein, said continuously used method includes: continuous use and/or periodical use in terms of time.

32. An apparatus for real-time service transmission comprising:
at least one processor configured to:
allocate semi-static service channel resources which are used continuously before being reconfigured or released;
receive said semi-static service channel resources for performing initial transmission of hybrid automatic repeat request of real-time service packets;
determine if said initially transmitted real-time service packet is correct, and allocate dynamic service channel resources when said initially transmitted real-time service packet is determined to be incorrect;
receive said dynamic service channel resources for retransmitting said real-time service packet;
determine if said retransmitted real-time service packet is correct, and reallocate dynamic service channel resources when said retransmitted real-time service packet is determined incorrect and the number of retransmissions does not reach a predefined threshold value;
send a hybrid automatic repeat request correct-receipt indication message under the condition that said initially transmitted or retransmitted real-time service packet is determined correct; and
send a hybrid automatic repeat request incorrect-receipt indication message and save said incorrect real-time service packet, under the condition that said initially transmitted or retransmitted real-time service packet is determined incorrect.

33. An apparatus for real-time service transmission, comprising:
at least one processor configured to:
allocate semi-static service channel resources which are used continuously before being reconfigured or released;
use said semi-static service channel resources to perform initial transmission of hybrid automatic repeat request of real-time service packets;
receive a hybrid automatic repeat request correct-receipt indication message which indicates that said initially transmitted real-time service packet is correct, or receive a hybrid automatic repeat request incorrect-receipt indication message which indicates that said initially transmitted real-time service packet is incorrect;
allocate dynamic service channel resources in the case of receiving the hybrid automatic repeat request incorrect-receipt indication message;
use said dynamic service channel resources to retransmit said real-time service packet;
receive a hybrid automatic repeat request correct-receipt indication message which indicates that said retransmitted real-time service packet is correct, or receive a hybrid automatic repeat request incorrect-receipt indication message which indicates that said retransmitted real-time service packet is incorrect;
send a hybrid automatic repeat request correct-receipt indication message under the condition that said initially transmitted or retransmitted real-time service packet is determined correct; and
send a hybrid automatic repeat request incorrect-receipt indication message and save said incorrect real-time service packet, under the condition that said initially transmitted or retransmitted real-time service packet is determined incorrect.

34. An apparatus for real-time service transmission comprising:
means for allocating semi-static service channel resources; wherein said semi-static service channel resources are used continuously before being reconfigured or released;

means for receiving said semi-static service channel resources for performing initial transmission of hybrid automatic repeat request of real-time service packets;

means for determining if said initially transmitted real-time service packet is correct, and allocating dynamic service channel resources when said initially transmitted real-time service packet is determined to be incorrect;

means for receiving said dynamic service channel resources for retransmitting said real-time service packet;

means for determining if said retransmitted real-time service packet is correct, and reallocating dynamic service channel resources when said retransmitted real-time service packet is determined incorrect and the number of retransmissions doesn't reach a predefined threshold value;

means for sending a hybrid automatic repeat request correct-receipt indication message under the condition that said initially transmitted or retransmitted real-time service packet is determined correct; and means for sending a hybrid automatic repeat request incorrect-receipt indication message and saving said incorrect real-time service packet, under the condition that said initially transmitted or retransmitted real-time service packet is determined incorrect.

35. An apparatus for real-time service transmission comprising:

means for allocating semi-static service channel resources; wherein, said semi-static service channel resources are used continuously before being reconfigured or released;

means for using said semi-static service channel resources to perform initial transmission of hybrid automatic repeat request of real-time service packets;

means for receiving a hybrid automatic repeat request correct-receipt indication message which indicates that said initially transmitted real-time service packet is correct, or receiving a hybrid automatic repeat request incorrect-receipt indication message which indicates that said initially transmitted real-time service packet is incorrect;

means for allocating dynamic service channel resources in the case of receiving the hybrid automatic repeat request incorrect-receipt indication message;

means for using said dynamic service channel resources to retransmit said real-time service packet; and means for receiving a hybrid automatic repeat request correct-receipt indication message which indicates that said retransmitted real-time service packet is correct, or receiving from a hybrid automatic repeat request incorrect-receipt indication message which indicates that said retransmitted real-time service packet is incorrect.

* * * * *